(12) United States Patent
Park et al.

(10) Patent No.: US 9,418,425 B2
(45) Date of Patent: Aug. 16, 2016

(54) 3D IMAGE ACQUISITION APPARATUS AND METHOD OF CALCULATING DEPTH INFORMATION IN THE 3D IMAGE ACQUISITION APPARATUS

(75) Inventors: Yong-hwa Park, Yongin-si (KR); Jang-woo You, Yongin-si (KR); Hee-sun Yoon, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 758 days.

(21) Appl. No.: 13/594,094

(22) Filed: Aug. 24, 2012

(65) Prior Publication Data

US 2013/0101176 A1    Apr. 25, 2013

(30) Foreign Application Priority Data

Oct. 25, 2011   (KR) .......................... 10-2011-0109431

(51) Int. Cl.
| | |
|---|---|
| G06T 7/00 | (2006.01) |
| G06K 9/00 | (2006.01) |
| H04N 5/222 | (2006.01) |
| G01S 17/36 | (2006.01) |

(Continued)

(52) U.S. Cl.
CPC .............. *G06T 7/0022* (2013.01); *G01S 7/4816* (2013.01); *G01S 7/493* (2013.01); *G01S 7/4912* (2013.01); *G01S 7/4915* (2013.01); *G01S 7/4918* (2013.01); *G01S 17/36* (2013.01); *G01S 17/89* (2013.01); *G06K 9/00201* (2013.01); *G06T 7/0051* (2013.01); *H04N 5/2226* (2013.01); *G06T 2207/10028* (2013.01); *H04N 2013/0081* (2013.01)

(58) Field of Classification Search
CPC ..... G01S 17/89; G01S 7/4915; G01S 7/4912; G01S 7/4918; G01S 7/4816; G01S 17/36; G01S 7/493; G06T 7/0022; G06T 7/0051; G06T 2207/10028; G06K 9/00201; H04N 5/2226; H04N 2013/0081
See application file for complete search history.

(56) References Cited

U.S. PATENT DOCUMENTS

| | | | | |
|---|---|---|---|---|
| 3,682,553 | A | * | 8/1972 | Kapany ..................... 356/5.04 |
| 4,935,616 | A | * | 6/1990 | Scott ...................... 250/214 VT |

(Continued)

FOREIGN PATENT DOCUMENTS

| | | |
|---|---|---|
| CN | 1194056 A | 9/1998 |
| JP | 2000-121339 A | 4/2000 |

(Continued)

OTHER PUBLICATIONS

Communication dated Feb. 8, 2013, issued by the European Patent Office in counterpart European Patent Application No. 12183111.9.

(Continued)

*Primary Examiner* — Manav Seth
(74) *Attorney, Agent, or Firm* — Sughrue Mion, PLLC

(57) ABSTRACT

A 3-dimensional (3D) image acquisition apparatus and a method of calculating depth information in the 3D image acquisition apparatus, the 3D image acquisition apparatus including: an optical modulator for modulating light reflected from a subject by sequentially projected N (N is 3 or a larger natural number) light beams; an image sensor for generating N sub-images by capturing the light modulated by the optical modulator; and a signal processor for calculating depth information regarding a distance to the subject by using the N sub-images.

33 Claims, 10 Drawing Sheets

(51) Int. Cl.
*G01S 17/89* (2006.01)
*G01S 7/481* (2006.01)
*G01S 7/493* (2006.01)
*G01S 7/491* (2006.01)
*H04N 13/00* (2006.01)

(56) References Cited

U.S. PATENT DOCUMENTS

| | | | |
|---|---|---|---|
| 5,081,530 A | 1/1992 | Medina | |
| 5,694,203 A | 12/1997 | Ogawa | |
| 6,057,909 A | 5/2000 | Yahav et al. | |
| 6,088,086 A | 7/2000 | Muguira et al. | |
| 6,091,175 A | 7/2000 | Kinsinger | |
| 6,091,905 A | 7/2000 | Yahav et al. | |
| 6,100,517 A | 8/2000 | Yahav et al. | |
| 6,118,946 A | 9/2000 | Ray et al. | |
| 6,288,776 B1* | 9/2001 | Cahill et al. | 356/5.1 |
| 6,323,942 B1 | 11/2001 | Bamji | |
| 6,331,911 B1 | 12/2001 | Manassen et al. | |
| 6,349,174 B1* | 2/2002 | Ray et al. | 396/106 |
| 6,456,793 B1* | 9/2002 | Ray et al. | 396/89 |
| 6,794,628 B2 | 9/2004 | Yahav et al. | |
| 6,822,681 B1 | 11/2004 | Aoki | |
| 6,856,355 B1 | 2/2005 | Ray et al. | |
| 7,016,519 B1 | 3/2006 | Nakamura et al. | |
| 7,060,957 B2 | 6/2006 | Lange et al. | |
| 7,095,487 B2* | 8/2006 | Gonzalez-Banos et al. | 356/4.07 |
| 7,230,685 B2 | 6/2007 | Suzuki et al. | |
| 7,995,191 B1* | 8/2011 | Sandusky | 356/5.14 |
| 8,289,606 B2 | 10/2012 | Park et al. | |
| 8,432,599 B2 | 4/2013 | Cho et al. | |
| 8,436,370 B2 | 5/2013 | Park et al. | |
| 8,492,683 B2 | 7/2013 | Challita et al. | |
| 8,581,166 B2 | 11/2013 | Cho et al. | |
| 8,619,354 B2 | 12/2013 | Park et al. | |
| 8,711,463 B2 | 4/2014 | Han et al. | |
| 8,902,411 B2* | 12/2014 | Park et al. | 356/5.1 |
| 8,953,238 B2 | 2/2015 | Kim et al. | |
| 9,123,164 B2* | 9/2015 | Park et al. | |
| 2006/0192938 A1 | 8/2006 | Kawahito | |
| 2008/0231832 A1* | 9/2008 | Sawachi | 356/5.1 |
| 2009/0059201 A1* | 3/2009 | Willner et al. | 356/5.01 |
| 2010/0177372 A1 | 7/2010 | Park et al. | |
| 2010/0182671 A1 | 7/2010 | Park | |
| 2010/0321755 A1 | 12/2010 | Cho et al. | |
| 2011/0058153 A1 | 3/2011 | Van Nieuwenhove et al. | |
| 2011/0063437 A1* | 3/2011 | Watanabe et al. | 348/140 |
| 2011/0176709 A1* | 7/2011 | Park et al. | 382/106 |
| 2012/0069176 A1 | 3/2012 | Park et al. | |
| 2012/0162380 A1 | 6/2012 | Cho et al. | |
| 2012/0300038 A1 | 11/2012 | You et al. | |

FOREIGN PATENT DOCUMENTS

| | | | |
|---|---|---|---|
| JP | 2008-241259 A | 10/2008 | |
| JP | 2010-071976 A | 4/2010 | |
| JP | 2010-96568 A | 4/2010 | |
| JP | 2010-520707 A | 6/2010 | |
| KR | 10-2011-0051391 A | 5/2011 | |
| KR | 10-2011-0085785 | * 7/2011 | G01C 3/00 |
| KR | 10-2012-0069406 | 6/2012 | |
| WO | 2011/020921 A1 | 2/2011 | |

OTHER PUBLICATIONS

Communication dated Sep. 28, 2015, issued by the State Intellectual Property Office of P.R. China in counterpart Chinese Application No. 201210315255.8.

Miyagawa et al, "CCD-Based Range-Finding Sensor", IEEE Transactions on Electron Devices, vol. 44, No. 10, Oct. 1997, pp. 1648-1652 (5 pages total).

Communication from the Japanese Patent Office dated Mar. 29, 2016 in a counterpart Japanese application No. 2012-233225.

* cited by examiner

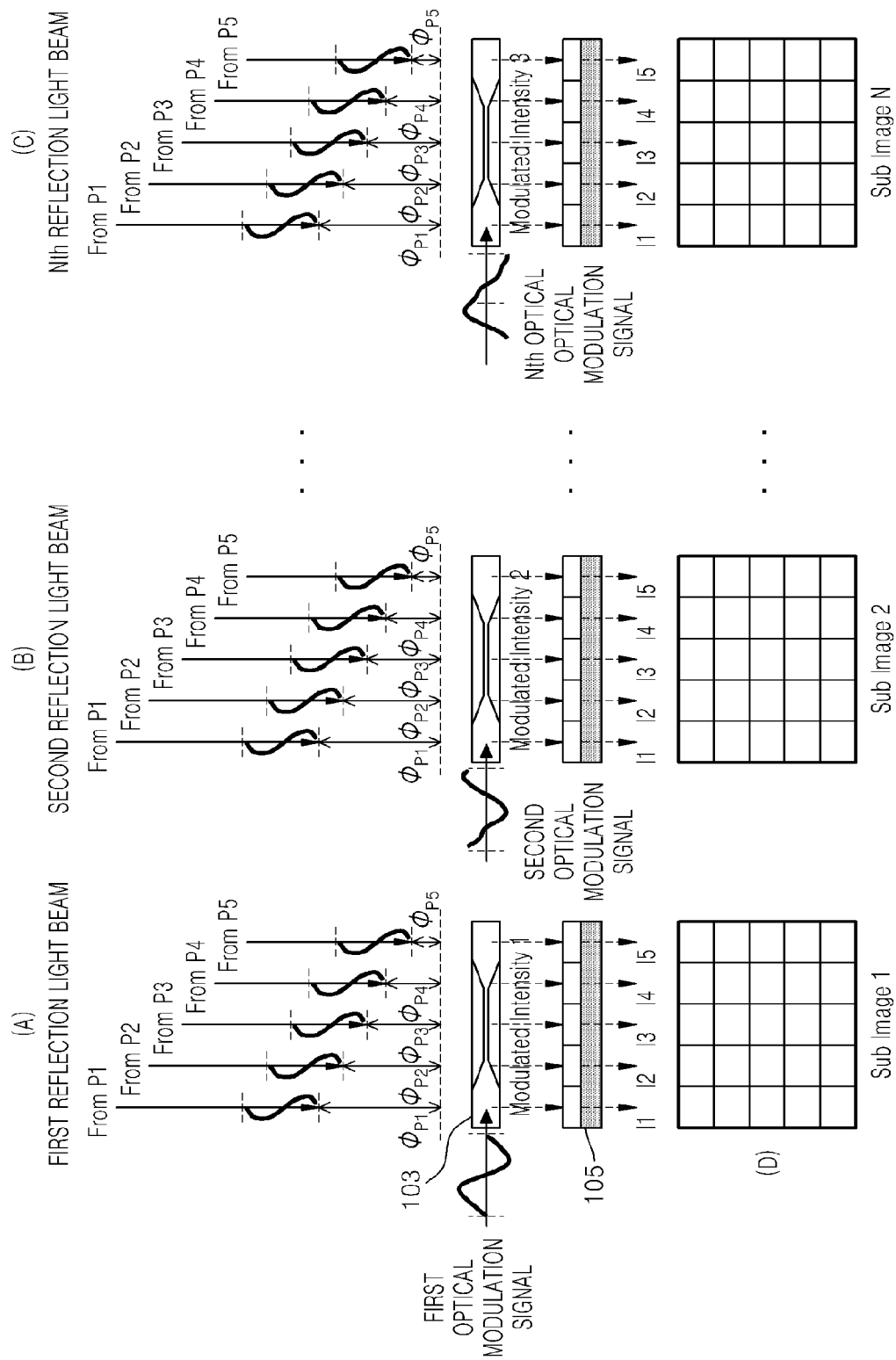

FIG. 8

Phase Shift:
N=3 (0°, 120°, 240°), N=4 (0°, 90°, 180°, 270°), N=5 (0°, 72°, 144°, 216°, 288°),
N=6 (0°, 60°, 120°, 180°, 240°, 300°), N=7 (0°, 51°, 103°, 154°, 206°, 257°, 309°),
N=8 (0°, 45°, 90°, 135°, 180°, 225°, 270°, 315°)
N=9 (0°, 40°, 80°, 120°, 160°, 200°, 240°, 280°, 320°)

$$\phi_{TOF}^{(AVG)} = \tan^{-1}\left(\frac{\sum_{k=1}^{N} A_k I_{CCD}^{(k)}}{\sum_{k=1}^{N} B_k I_{CCD}^{(k)}}\right)$$

| No of CCD meas. | Weight. Factors | $I_{CCD1}$ | $I_{CCD2}$ | $I_{CCD3}$ | $I_{CCD4}$ | $I_{CCD5}$ | $I_{CCD6}$ | $I_{CCD7}$ | $I_{CCD8}$ | $I_{CCD9}$ | $I_{CCD10}$ |
|---|---|---|---|---|---|---|---|---|---|---|---|
| N=3 | $A_k$ | 0 | -1 | 1 | - | - | - | - | - | - | - |
|     | $B_k$ | 1.1547 | -0.5774 | -0.5774 | - | - | - | - | - | - | - |
| N=4 | $A_k$ | 0 | -1 | 0 | 1 | - | - | - | - | - | - |
|     | $B_k$ | 1 | 0 | -1 | 0 | - | - | - | - | - | - |
| N=5 | $A_k$ | 0 | -1 | -0.6180 | 0.6180 | 1 | - | - | - | - | - |
|     | $B_k$ | 1.0515 | 0.3249 | -0.8507 | -0.8507 | 0.3249 | - | - | - | - | - |
| N=6 | $A_k$ | 0 | -1 | -1 | -1 | 1 | 1 | - | - | - | - |
|     | $B_k$ | 1.1547 | 0.5774 | -0.5774 | -1.1547 | -0.5774 | 0.5774 | - | - | - | - |
| N=7 | $A_k$ | 0 | -0.8019 | -1 | -0.4450 | 0.4450 | 1 | 0.8019 | - | - | - |
|     | $B_k$ | 1.0257 | 0.6395 | -0.2282 | -0.9241 | -0.9241 | -0.2282 | 0.6395 | - | - | - |
| N=8 | $A_k$ | 0 | -0.7071 | -1 | -0.7071 | 0 | 0.7071 | 1 | 0.7071 | - | - |
|     | $B_k$ | 1 | 0.7071 | 0 | -0.7071 | -1 | -0.7071 | 0 | 0.7071 | - | - |
| N=9 | $A_k$ | 0 | -0.6527 | -1 | -0.8794 | -0.3473 | 0.3473 | 0.8794 | 1 | 0.6527 | - |
|     | $B_k$ | 1.0154 | 0.7779 | 0.1763 | -0.5077 | -0.9542 | -0.9542 | -0.5077 | 0.1763 | 0.7779 | - |
| N=10 | $A_k$ | 0 | -0.6180 | -1 | -1 | -0.6180 | 0 | 0.6180 | 1 | 1 | 0.6180 |
|      | $B_k$ | 1.0515 | 0.8507 | 0.3249 | -0.3249 | -0.8507 | -1.0515 | -0.8507 | -0.3249 | 0.3249 | 0.8507 |

# 3D IMAGE ACQUISITION APPARATUS AND METHOD OF CALCULATING DEPTH INFORMATION IN THE 3D IMAGE ACQUISITION APPARATUS

CROSS-REFERENCE TO RELATED APPLICATIONS

This application claims priority from Korean Patent Application No. 10-2011-0109431, filed on Oct. 25, 2011, in the Korean Intellectual Property Office, the disclosures of which are incorporated herein in their entirety by reference.

BACKGROUND

1. Field

The present disclosure relates to 3-dimensional (3D) image acquisition apparatuses and methods of calculating depth information in the 3D image acquisition apparatuses.

2. Description of the Related Art

Recently, the importance of 3-dimensional (3D) content is increasing with the development and the increase in demand of 3D display devices for displaying images having depth perception. Accordingly, there is research being conducted into 3D image acquisition apparatuses, such as a 3D camera by which a user personally creates 3D content. Such a 3D camera acquires depth information in addition to existing 2D color image information in one capture.

Depth information regarding distances between surfaces of a subject and a 3D camera may be acquired using a stereo vision method using two cameras or a triangulation method using structured light and a camera. However, since the accuracy of depth information in these methods rapidly decreases as a distance to a subject increases and these methods depend on a surface state of the subject, it is difficult to acquire accurate depth information.

To improve this problem, a Time-of-Flight (TOF) method has been introduced. The TOF method is a method of measuring a light beam's flight time until the light reflected from a subject is received by a light-receiving unit after an illumination light is projected to the subject. According to the TOF method, light of a predetermined wavelength (e.g., Near Infrared (NIR) light of 850 nm) is irradiated to a subject by using an illumination optical system including a Light-Emitting Diode (LED) or a Laser Diode (LD). A light having the same wavelength is reflected from the subject and is received by a light-receiving unit. Thereafter, a series of processing processes for calculating depth information are performed. Various TOF technologies are introduced according to the series of processing processes.

In the TOF method described above, depth information is calculated by assuming an ideal environment without noise. However, when a 3D camera is used, ambient light, such as illumination in an indoor environment and sunlight in an outdoor environment, always exists in the surroundings. The ambient light is incident to the 3D camera and becomes noise in a process of calculating depth information.

Accordingly, it is necessary to reduce ambient light causing noise in the process of calculating depth information.

SUMMARY

Provided are a method of calculating depth information by reducing captured ambient light and a 3D image acquisition apparatus therefor.

Additional aspects will be set forth in part in the description which follows and, in part, will be apparent from the description, or may be learned by practice of the exemplary embodiments.

According to an aspect of an exemplary embodiment, a 3-dimensional (3D) image acquisition apparatus includes: an optical modulator for modulating light reflected from a subject by sequentially projected N (N is 3 or a larger natural number) light beams; an image sensor for generating N sub-images by capturing the light modulated by the optical modulator; and a signal processor for calculating depth information regarding a distance to the subject by using the N sub-images.

The N light beams may be discontinuously projected.

The N projected light beams may be different from each other and be emitted by one or more light sources.

The one or more light sources may sequentially project the N light beams with a predetermined time interval.

An operating time of the optical modulator may be synchronized with a projecting time of each of the N light beams.

The operating time of the optical modulator may be shorter than the projecting time.

An exposure time of the image sensor may be synchronized with the operating time of the optical modulator.

The image sensor may be exposed during the light-projecting time to capture the modulated light and may form the N sub-images during at least a portion of a remaining time of the light-projecting time.

All pixels of the image sensor may be exposed to the modulated light during the light-projecting time.

The N light beams may be periodic waves having the same period and at least one selected from the group consisting of a different intensity and a different phase.

The optical modulator may modulate the reflected light with the same modulation signal.

The N light beams may be the same periodic waves.

The optical modulator may modulate the reflected light with different modulation signals.

A phase difference between any two light beams projected at adjacent times from among the N light beams may be a value obtained by equally dividing 360° by N.

The reflected light may include N reflection light beams obtained by reflecting the N light beams from the subject.

The N sub-images generated by the image sensor may sequentially one-to-one match the N reflection light beams.

If the N sub-images do not one-to-one match the N reflection light beams, the signal processor may convert the N sub-images on a line by line basis and sequentially one-to-one match the N line-based sub-images with the N reflection light beams.

The signal processor may generate a first average image by averaging the N sub-images multiplied by first weighting factors, generate a second average image by averaging the N sub-images multiplied by second weighting factors, and calculate the depth information from the first average image and the second average image.

The depth information may be calculated from an arctangent value of a ratio of the first average image to the second average image.

According to another aspect of an exemplary embodiment, a method of calculating depth information includes: modulating light reflected from a subject by sequentially projecting N (N is 3 or a larger natural number) light beams; generating N sub-images by capturing the light modulated by the optical modulator; and calculating depth information regarding a distance to the subject by using the N sub-images.

The N light beams may be discontinuously projected.

The N projected light beams may be different from each other and be emitted by one or more light sources.

The N light beams may be sequentially projected with a predetermined time interval.

An operating time of an optical modulator for modulating the light may be synchronized with a projecting time of each of the N light beams.

The operating time of the optical modulator may be shorter than the projecting time.

An exposure time of an image sensor for capturing the light may be synchronized with the operating time of the optical modulator.

All pixels of the image sensor may be exposed to the modulated light during the light-projecting time.

The N light beams may be periodic waves having the same period and at least one selected from the group consisting of a different intensity and a different phase, and the reflected light may be modulated with the same modulation signal.

The N light beams may be the same periodic waves, and the reflected light may be modulated with different modulation signals.

A phase difference between any two light beams projected at adjacent times from among the N light beams may be a value obtained by equally dividing 360° by N.

The generated N sub-images may sequentially one-to-one match the N reflection light beams.

The method may further include, if the N sub-images do not one-to-one match the N reflection light beams, converting the N sub-images on a line by line basis and sequentially one-to-one matching the N line-based sub-images with the N reflection light beams.

A first average image may be generated by averaging the N sub-images multiplied by first weighting factors, a second average image may be generated by averaging the N sub-images multiplied by second weighting factors, and the depth information may be calculated from the first average image and the second average image.

The depth information may be calculated from an arctangent value of a ratio of the first average image to the second average image.

BRIEF DESCRIPTION OF THE DRAWINGS

These and/or other aspects will become apparent and more readily appreciated from the following description of the embodiments, taken in conjunction with the accompanying drawings in which:

FIGS. 3A to 3C illustrate a process of generating N different sub-images with one projection light beam and N different optical modulation signals, according to an exemplary embodiment;

FIG. 8 is a table illustrating weighting factors $A_k$ and $B_k$, according to an exemplary embodiment.

DETAILED DESCRIPTION

Figure 1:
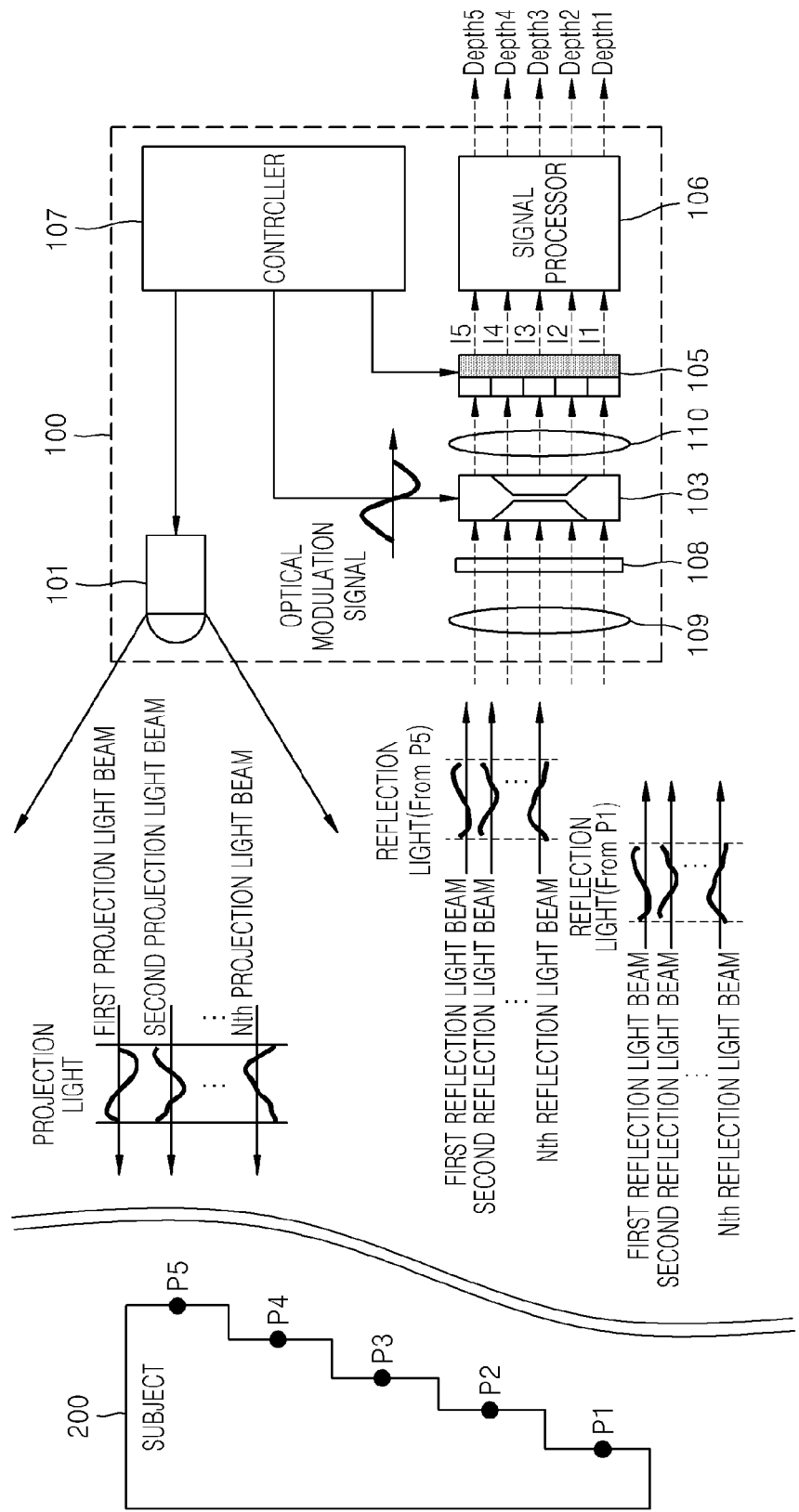
FIG. 1 is a schematic diagram of a 3-dimensional (3D) image acquisition apparatus according to an exemplary embodiment.

Reference will now be made in detail to exemplary embodiments, examples of which are illustrated in the accompanying drawings. In the drawings, the widths and thicknesses of layers and regions are exaggerated for the clarity of the specification. In the description, like reference numerals refer to like elements throughout. Expressions such as "at least one of," when preceding a list of elements, modify the entire list of elements and do not modify the individual elements of the list.

FIG. 1 is a schematic diagram of a 3-dimensional (3D) image acquisition apparatus 100 according to an exemplary embodiment. Referring to FIG. 1, the 3D image acquisition apparatus 100 may include a light source 101 for generating light having a predetermined wavelength, an optical modulator 103 for modulating light reflected from a subject 200, an image pickup device 105 (e.g., an image sensor) for generating a sub-image from the modulated light, a signal processor 106 for calculating depth information based on a sub-image formed by the image pickup device 105 and generating an image including the depth information, and a controller 107 for controlling operations of the light source 101, the optical modulator 103, the image pickup device 105, and the signal processor 106.

In addition, the 3D image acquisition apparatus 100 may further include, in front of a light-incident face of the optical modulator 103, a filter 108 for transmitting only light having a predetermined wavelength from among the light reflected from the subject 200 and a first lens 109 for concentrating the reflected light within an area of the optical modulator 103, and a second lens 110 for concentrating the modulated light within an area of the image pickup device 105 between the optical modulator 103 and the image pickup device 105.

The light source 101 may be for example a Light-Emitting Diode (LED) or a Laser Diode (LD) capable of emitting light having a Near Infrared (NIR) wavelength of about 850 nm that is invisible to human eyes for safety. However, the light source 101 is not limited to a wavelength band or type.

Light projected from the light source 101 to the subject 200 may have a form of a periodic continuous function having a predetermined period. For example, the projected light may have a specifically defined waveform such as a sine wave, a ramp wave, or a square wave, or an undefined general waveform. In addition, the light source 101 may intensively project light to the subject 200 for only a predetermined time in a periodic manner under control of the controller 107. A time that light is projected to the subject 200 is called a light-projecting time.

The optical modulator 103 modulates light reflected from the subject 200 under control of the controller 107. For example, the optical modulator 103 may modulate the intensity of the reflected light by changing a gain in response to an optical modulation signal having a predetermined wavelength. To do this, the optical modulator 103 may have a variable gain.

The optical modulator 103 may operate at a high modulation frequency of tens to hundreds of MHz to identify a phase difference or a traveling time of light according to a distance. The optical modulator 103 satisfying this condition may be at least one of a sub-image intensifier including a Multi-Channel Plate (MCP), a solid optical modulator of the GaAs series, or a thin-type optical modulator using an electro-optic material. Although the optical modulator 103 is a transmission-type optical modulator in FIG. 1, a reflection-type optical modulator may also be used.

Like the light source 101, the optical modulator 103 may also operate for a predetermined time to modulate the light reflected from the subject 200. A time that the optical modulator 103 operates to modulate light is called an operating time of the optical modulator 103. The light-projecting time of the light source 101 may be synchronized with the operating time of the optical modulator 103. Thus, the operating time of the optical modulator 103 may be the same as or shorter than the light-projecting time of the light source 101.

The image pickup device 105 generates a sub-image by detecting the reflected light modulated by the optical modulator 103 under control of the controller 107. If only a distance to any one point on the subject 200 is to be measured, the image pickup device 105 may use a single optical sensor such as, for example, a photodiode or an integrator. However, if distances to a plurality of points on the subject 200 are to be measured, the image pickup device 105 may have a plurality of photodiodes or a 2D or 1D array of other optical detectors. For example, the image pickup device 105 may include a Charge-Coupled Device (CCD) image sensor or a Complimentary Metal-Oxide Semiconductor (CMOS) image sensor. The image pickup device 105 may generate a single sub-image per reflected light beam.

The signal processor 106 calculates depth information based on a sub-image formed by the image pickup device 105 and generates a 3D image including the depth information. The signal processor 106 may be implemented by, for example, an exclusive Integrated Circuit (IC) or software installed in the 3D image acquisition apparatus 100. When the signal processor 106 is implemented by software, the signal processor 106 may be stored in a separate portable storage medium.

Hereinafter, an operation of the 3D image acquisition apparatus 100 having the above-described structure is described.

The light source 101 sequentially and intensively projects N different light beams having a predetermined period and waveform to the subject 200 under control of the controller 107, wherein N may be 3 or a larger natural number. The light source 101 may sequentially project the N different light beams continuously or within a predetermined time interval.

For example, when 4 different projection light beams are used, the light source 101 may generate and project a first projection light beam to the subject 200 for a time T1, a second projection light beam to the subject 200 for a time T2, a third projection light beam to the subject 200 for a time T3, and a fourth projection light beam to the subject 200 for a time T4. These first to fourth projection light beams sequentially projected to the subject 200 may have a form of a continuous function having a predetermined period, such as a sine wave. For example, the first to fourth projection light beams may be periodic waves having the same period and waveform and different intensities or phases.

When the N different light beams are projected, a phase difference between any two of the light beams projected at the same time may be 360°/N, and the period of each projected light beam may be shorter than the operating time of the light source 101. All of the N different light beams may be sequentially projected to the subject 200 within the operating time of the light source 101.

A light beam projected to the subject 200 is reflected on the surface of the subject 200 and incident to the first lens 109. In general, the subject 200 has a plurality of surfaces having different distances, i.e., depths, from the 3D image acquisition apparatus 100. FIG. 1 illustrates the subject 200 having 5 surfaces P1 to P5 having different depths for simplification of description. When the projected light beam is reflected from the 5 surfaces P1 to P5 having different depths, 5 differently time-delayed (i.e., different phases) reflection light beams are generated.

For example, 5 first reflection light beams having different phases are generated when a first projection light beam is reflected from the 5 surfaces P1 to P5 of the subject 200, and 5 second reflection light beams having different phases are generated when a second projection light beam is reflected from the 5 surfaces P1 to P5 of the subject 200. Likewise, 5×N reflection light beams having different phases are generated when an Nth projection light beam is reflected from the 5 surfaces P1 to P5 of the subject 200. A reflection light beam reflected from the surface P1 that is farthest from the 3D image acquisition apparatus 100 may arrive at the first lens 109 with a phase delay of $\Phi_{P1}$, and a reflection light beam reflected from the surface P5 that is nearest from the 3D image acquisition apparatus 100 may arrive at the first lens 109 with a phase delay of $\Phi_{P5}$ that is less than $\Phi_{P1}$.

The first lens 109 focuses the reflection light within an area of the optical modulator 103. The filter 108 for transmitting only light having a predetermined wavelength may be disposed between the first lens 109 and the optical modulator 103 to remove ambient light, such as background light, except for the predetermined wavelength. For example, when the light source 101 emits light having an NIR wavelength of about 850 nm, the filter 108 may be an NIR band pass filter for transmitting an NIR wavelength band of about 850 nm. Thus, although light incident to the optical modulator 103 may be mostly light emitted from the light source 101 and reflected from the subject 200, ambient light is also included therein. Although FIG. 1 shows that the filter 108 is disposed between the first lens 109 and the optical modulator 103, positions of the first lens 109 and the filter 108 may be exchanged. For example, NIR light first passing through the filter 108 may be focused on the optical modulator 103 by the first lens 109.

The optical modulator 103 modulates the reflection light into an optical modulation signal having a predetermined wavelength. For convenience of description, it is assumed that the 5 surfaces P1 to P5 of the subject 200 correspond to pixels divided in 5 areas of the image pickup device 105. A period of a gain wavelength of the optical modulator 103 may be the same as a period of a projection light wavelength. In FIG. 1, the optical modulator 103 may modulate the 5 first reflection light beams reflected from the 5 surfaces P1 to P5 of the subject 200 and provide the modulated light beams to the image pickup device 105 and, in succession, may sequentially modulate the 5 second reflection light beams into the 5×N reflection light beams and provide the modulated light beams to the image pickup device 105. The intensity of the reflection light may be modulated by an amount obtained by multiplying it by an optical modulation signal when the reflection light passes through the optical modulator 103. A period of the optical modulation signal may be the same as that of the projection light.

The intensity-modulated light output from the optical modulator 103 is multiplication-adjusted and refocused by the second lens 110 and arrives at the image pickup device 105. Thus, the modulated light is concentrated within the area of the image pickup device 105 by the second lens 110. The image pickup device 105 may generate sub-images by receiving the modulated light for a predetermined time through synchronization with the light source 101 and the optical modulator 103. A time that the image pickup device 105 is exposed to receive the modulated light is an exposure time of the image pickup device 105.

A method of generating N sub-images from N reflection light beams will now be described.

FIGS. 2A to 2D illustrate a process of generating N different sub-images by modulating N different reflection light beams, according to an exemplary embodiment.

Figure 2:
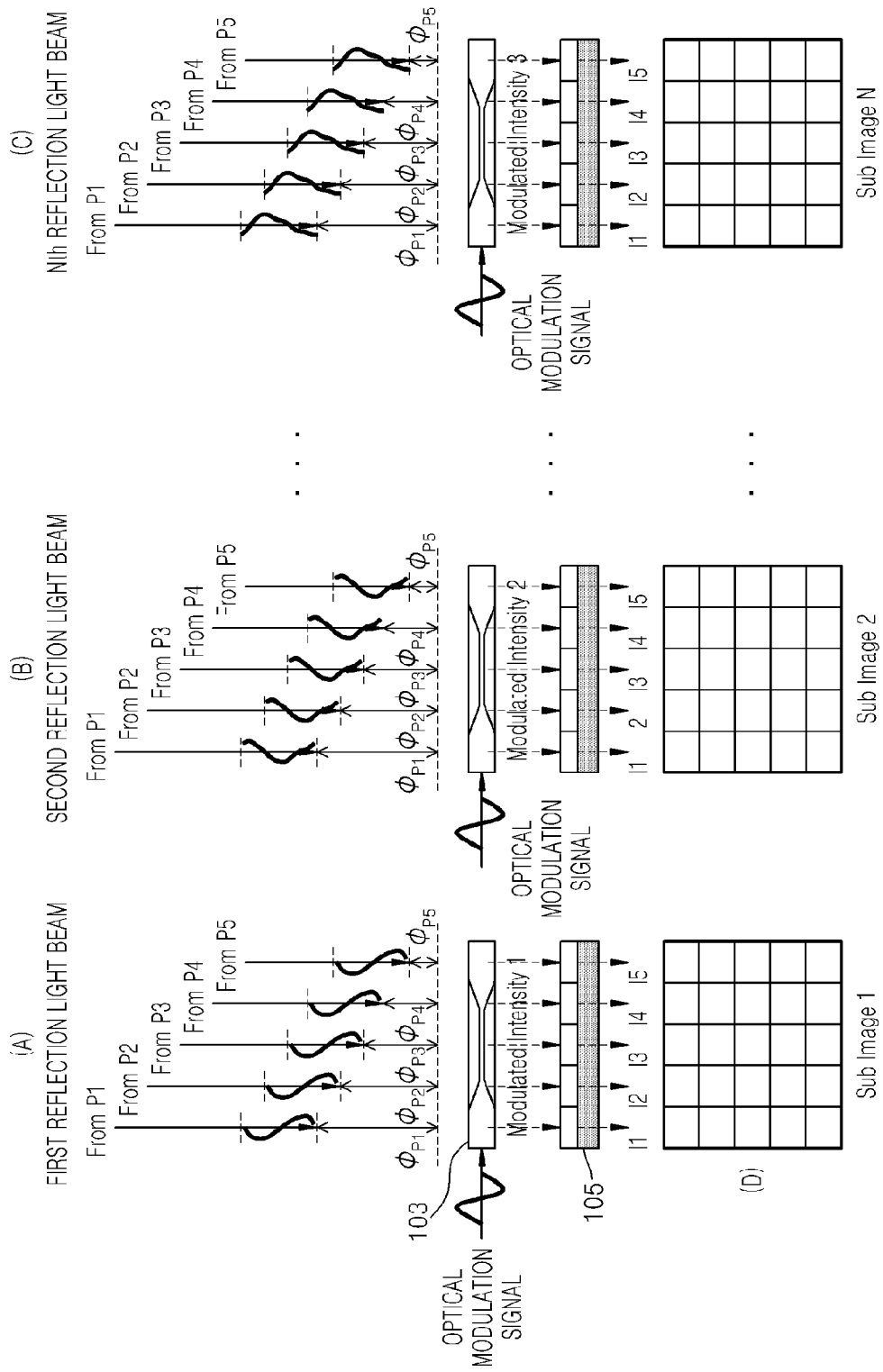
FIGS. 2A to 2C illustrate a process of generating N different sub-images by modulating N different reflection light beams, according to an exemplary embodiment.

As shown in FIG. 2A, the image pickup device 105 generates a first sub-image by receiving, for a predetermined exposure time, 5 first reflection light beams modulated after being reflected from the 5 surfaces P1 to P5 of the subject 200. Thereafter, as shown in FIG. 2B, the image pickup device 105 generates a second sub-image by receiving, for the predetermined exposure time, 5 second reflection light beams modulated after being reflected from the 5 surfaces P1 to P5 of the subject 200. After repeating these procedures, as shown in FIG. 2C, the image pickup device 105 finally generates an Nth sub-image by receiving, for the predetermined exposure time, 5×N reflection light beams modulated after being reflected from the 5 surfaces P1 to P5 of the subject 200. In this manner, the N different sub-images may be sequentially obtained as shown in FIG. 2D.

The first to Nth sub-images may be sub-frame images for generating a single frame of an image. For example, assuming that a period of a single frame is Td, an exposure time of the image pickup device 105 to obtain each of the first to Nth sub-images may be about Td/N.

In FIGS. 2A to 2D, a case of generating N different sub-images by using N different projection light beams and N different reflection light beams has been described. However, it is also possible that the same reflection light beam is used for all sub-images and the optical modulator 103 modulates a reflection light beam for each of the sub-images with a different gain waveform.

FIGS. 3A to 3D illustrate a process of generating N different sub-images with one same projection light beam and N different optical modulation signals, according to an exemplary embodiment. Referring to FIG. 3, reflection light beams generated by reflecting the projection light beam from the subject 200 have the same waveform and phase for all sub-images. As described above, reflection light beams for each sub-image have different phase delays $\Phi_{P1}$ to $\Phi_{P5}$ according to the surfaces P1 to P5 of the subject 200. As shown in FIGS. 3A to 3C, the optical modulator 103 modulates 5 first reflection light beams by using a first optical modulation signal, modulates 5 second reflection light beams by using a second optical modulation signal different from the first optical modulation signal, and modulates 5×N reflection light beams by using an Nth optical modulation signal different from any other optical modulation signal. Here, the first to Nth optical modulation signals may have waveforms totally different from each other or have the same period and waveform except for their phases. Accordingly, as shown in FIG. 3D, the image pickup device 105 may obtain N first to Nth sub-images that are different from each other.

Hereinafter, a method of generating sub-images by using signal waveforms is described.

For convenience of description, an embodiment in which the light source 101 projects N different projection light beams to the subject 200 and the optical modulator 103 uses a single same optical modulation signal is described as an example. However, the theoretical description below may be equally applied to a case where one same projection light beam and N different optical modulation signals are used. In addition, since a method of calculating depth information is equally applied to each pixel even for a case where a sub-image formed by the image pickup device 105 is a 2D array sub-image, only a method applied to a single pixel is described. However, when depth information is calculated from a plurality of pixels in a 2D array sub-image at the same time, a computation amount may be reduced by omitting a portion to be repetitively processed by efficiently processing data management and memory allocation.

First, a waveform $P_e$ of general projection light having a period $T_e$ may be expressed by Equations 1-1 and 1-2.

$$P_e^{(s)}(t) = a^{(s)}\sin(\omega t - \theta^{(s)}) + \overline{P}_{ave} \qquad (1\text{-}1)$$

$$P_e^{(s)}(t) = \sum_{k=1}^{m}\{a_k^{(s)}\sin(k\omega t) + b_k^{(s)}\cos(k\omega t)\} + \overline{P}_{ave} \qquad (1\text{-}2)$$

Here, s denotes an identifier for identifying first to Nth projection light beams that are different from each other. For example, when N projection light beams are used, s=1, 2, ..., N. In addition, ω denotes an angular frequency of a waveform of each projection light beam, wherein ω=2π/Te. An angular frequency may be in the range of 10 MHz-30 MHz used when capturing depth images ranging from 0-15 m. In addition, $a^{(s)}$ denotes the intensity of a projection light beam (s), and $\theta^{(s)}$ denotes a phase of the projection light beam (s). In addition, $\overline{P}_{ave}$ denotes a Direct Current (DC) offset value that may exist in each projection light beam.

A waveform $P_r$ of reflection light that returns to the 3D image acquisition apparatus 100 with a phase difference $\Phi_{TOF}$ after the projection light is reflected from the subject 200 may be expressed by Equations 2-1 to 2-3.

$$P_r^{(s)}(t) = r\lfloor a^{(s)}\sin(\omega t - \theta^{(s)} - \phi_{TOF}) + \overline{P}_{ave}\rfloor + \overline{P}_a \qquad (2\text{-}1)$$

$$P_r^{(s)}(t) = r\left[\sum_{k=1}^{m}\{a_k^{(s)}\sin(k\omega(t - t_{TOF})) + b_k^{(s)}\cos(k\omega(t - t_{TOF}))\} + \overline{P}_{ave}\right] + \overline{P}_a \qquad (2\text{-}2 \text{ and } 2\text{-}3)$$

$$= r\left[\sum_{k=1}^{m}\{a_k^{(s)}\sin(k\omega(t - t_{TOF})) + b_k^{(s)}\cos(k\omega(t - t_{TOF}))\} + \overline{P}_{ave}\right] + \overline{P}_a$$

Here, r denotes a reflection degree of each surface of the subject 200, and denotes an ambient light component incident to the 3D image acquisition apparatus 100 regardless of the projection light.

In addition, a waveform G of the optical modulation signal of the optical modulator 103 may be expressed by Equations 3-1 and 3-2. In Equation 3, a coefficient 'c' denotes the amount or gain of the optical modulation signal and may be in range of 0-1, and is usually 0.5. $\overline{G}_{ave}$ denotes a DC offset value that may exist in the optical modulation signal. Here, it is assumed that the optical modulator 103 is controlled so that an angular frequency of the optical modulation signal is the same angular frequency ω as that of the projection light.

$$G(t) = c\sin(\omega t) + \overline{G}_{ave} \quad (3\text{-}1)$$

$$G(t) = \sum_{k=1}^{n} \{c_k \sin(k\omega t) + d_k \cos(k\omega t)\} + \overline{G}_{ave} \quad (3\text{-}2)$$

A waveform of light arriving at the image pickup device 105 after passing through the optical modulator 103 may be a result obtained by multiplying the reflection light expressed by Equation 2 by the optical modulation signal. Thus, an instantaneous waveform $I_{inst}$ of the light arriving at the image pickup device 105 may be expressed by Equation 4.

$$I_{inst}^{(s)}(t) = P_r^{(s)}(t) \times G(t) \quad (4)$$

The image pickup device 105 may generate a sub-image by receiving incident light for a predetermined exposure time T. Thus, the sub-image generated by the image pickup device 105 is obtained by integrating the instantaneous waveform expressed by Equation 4 for the exposure time T. Here, the exposure time T may be the same as a period of a sub-frame. For example, when capturing is performed at a speed of 30 frames per second and each frame has N sub-frames, the exposure time T may be about 0.033/N seconds. Although a predetermined conversion ratio may exist between the intensity of the light arriving at the image pickup device 105 and a sub-image formed by the image pickup device 105 according to the sensitivity of the image pickup device 105, the predetermined conversion ratio may be simplified for convenience of description to define a sub-image $I^{(s)}$ of the image pickup device 105 by Equation 5.

$$I^{(s)} \equiv \frac{2}{T} \int_0^T I_{inst}^{(s)}(t) dt \quad (5)$$

As expressed by Equation 5, the formed sub-image $I^{(s)}$ includes an ambient light component. The ambient light, such as sunlight or illumination light, has a basic characteristic that it always exists with a uniform amount. On the contrary, the waveform of the projection light may be adjusted as desired. Accordingly, the light source 101 is synchronized with the optical modulator 103 so that the projection light is intensively projected for a predetermined time and the optical modulator 103 operates for the predetermined time to modulate reflected light. In addition, the optical modulator 103 may not operate for a time interval for which the projection light is not projected to maintain a minimum transmittance, thereby preventing the ambient light from being received. By doing this, the ambient light component of Equation 5 may be reduced. Here, a ratio of a projecting time of the projection light to a non-projecting time of the projection light is called a duty rate. When a duty rate is less than 100%, light is discontinuously projected.

Figure 4A:
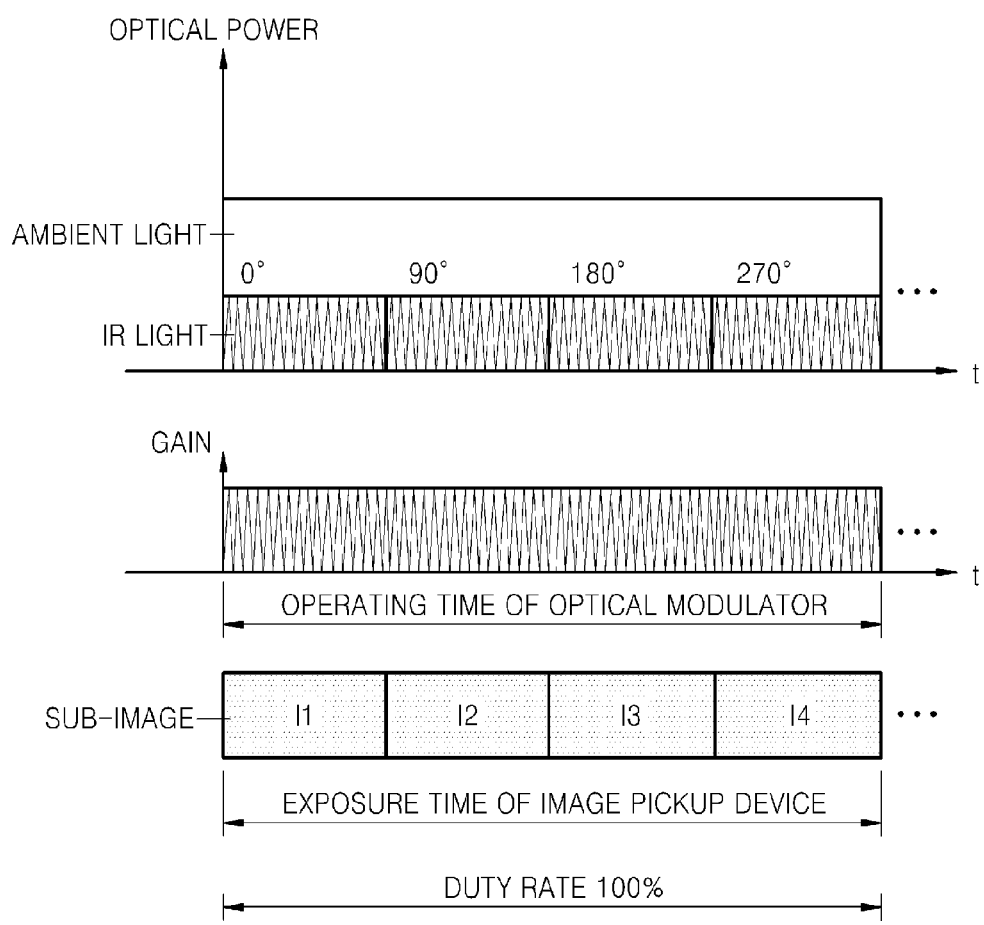
FIGS. 4A and 4B are time graphs when a 3D image is captured when a duty rate of projection light is 100% and a case where a duty rate of projection light is 20%, respectively, according to an exemplary embodiment.
Figure 4B:
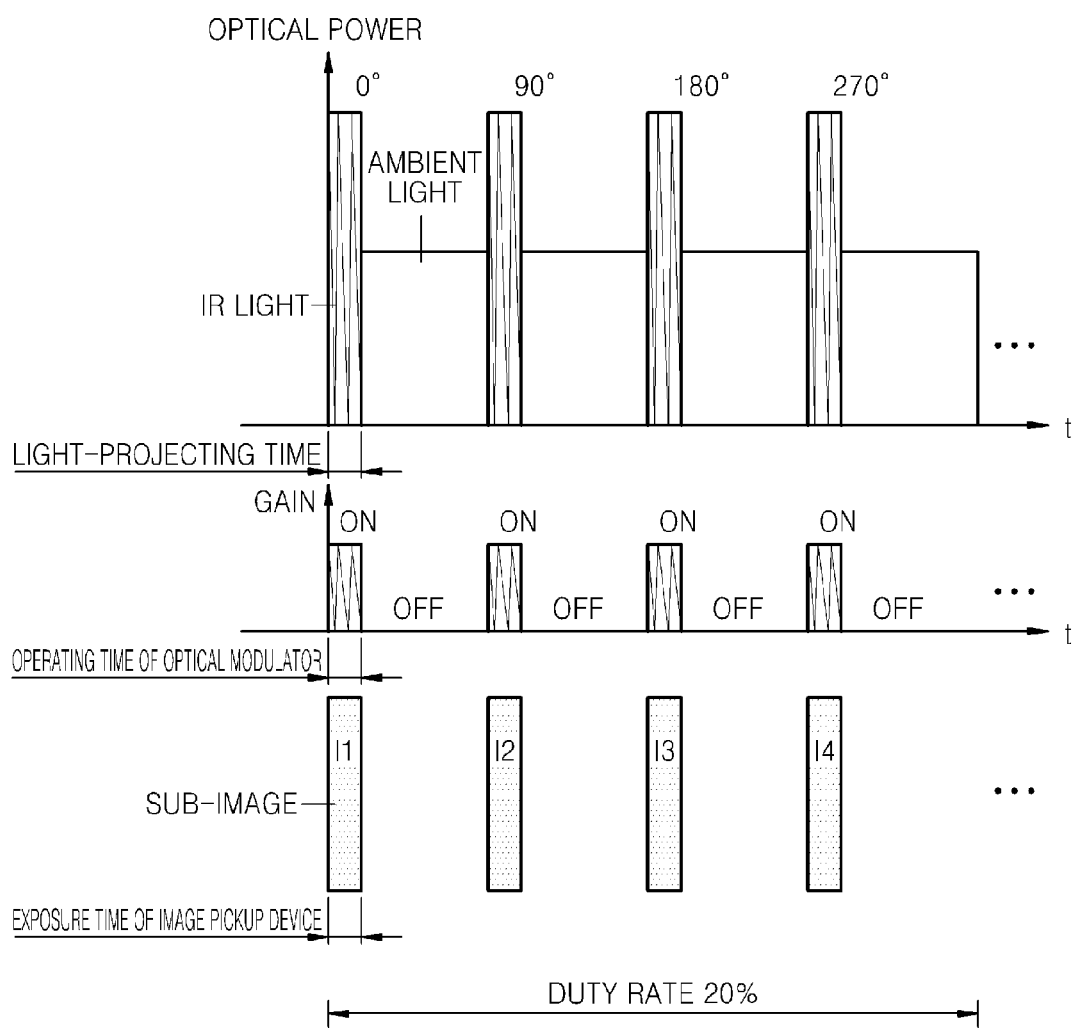

FIG. 4A is a time graph when a 3D image is captured when a duty rate of projection light is 100%, and FIG. 4B is a time graph when a 3D image is captured when a duty rate of projection light is 20%. In FIGS. 4A and 4B, the light source 101, the optical modulator 103, and the image pickup device 105 operate. It is assumed that light output from the light source 101 is infrared light and that the light source 101 of FIG. 4B intensively projects light to the subject 200 by increasing instantaneous power only for a predetermined time so that the same light intensity is incident to the optical modulator 103. In FIGS. 4A and 4B, the intensity of ambient light and the intensity of the infrared light are only examples and are not limited thereto. For example, the intensity of the infrared light with a duty rate of 100% may be greater than the intensity of ambient light. For example, the intensity of the infrared light may be greater than the intensity of ambient light in an indoor, cloudy, or dark environment, and the intensity of ambient light may be greater than the intensity of the infrared light in a seaside or sunny environment.

In FIG. 4A, the optical modulator 103 is synchronized with a light-projecting time of the light source 101 and modulates light reflected from the subject 200. Then, the image pickup device 105 generates a sub-image by using the modulated light. Here, since the light incident to the optical modulator 103 also includes ambient light in addition to the light projected from the light source 101 and reflected from the subject 200, the optical modulator 103 may modulate the light including the ambient light, and the sub-image generated by the image pickup device 105 may also include an ambient light component.

The light source 101 of FIG. 4B intensively projects light to the subject 200 by increasing instantaneous power only for a predetermined time. In addition, an operating time of the optical modulator 103 is synchronized with a light-projecting time of the light source 101 and modulates light reflected from the subject 200. Furthermore, the optical modulator 103 may not operate for a time for which the light is not projected to maintain a minimum transmittance, thereby preventing the ambient light from being received. As a result, in a sub-image captured by the image pickup device 105, an ambient light component may be reduced and a projection light component of the light source 101 may be maintained. For example, the optical modulator may block the ambient light when the light source is in OFF state ("external shutter"). Also, the optical modulator works as a "global shutter", which may turn on-and-off every pixel in an image plane at the same time. The global shuttering and external shuttering features enable the camera to prevent the ambient light from being received. Accordingly, when a duty rate of projection light is reduced from 100% to 20%, the ambient light component may also be reduced by ⅕, and a Signal-to-Noise (S/N) ratio due to the ambient light component may increase by 5 times the S/N ratio of a duty rate of 100%.

As described above, to reduce an ambient light component, the light source 101 is supposed to project light at a duty rate less than 100%. In addition, the operating time of the optical modulator 103 is supposed to be synchronized with the light-projecting time of the light source 101 and simultaneously operate at a high modulation frequency of tens to hundreds of MHz. The optical modulator 103 satisfying this condition may be, for example, a sub-image intensifier including an MCP, a solid optical modulator of the GaAs series, or a thin-type optical modulator using an electro-optic material.

The image pickup device 105 may operate as a global shutter or a rolling shutter. The operating principle of a global shutter is that all pixels are exposed at the same time when a single sub-image is generated. Thus, there is no exposure time difference between the pixels. However, the operating principle of a rolling shutter is that each pixel is sequentially exposed when a single sub-image is generated. Thus, there is an exposure time difference between every two pixels.

An exposure time of the image pickup device 105 may also be synchronized with the light-projecting time of the light source 101 and the operating time of the optical modulator 103. When the image pickup device 105 operates as a global shutter, the controller 107 synchronizes the exposure time of the image pickup device 105 with the operating time of the optical modulator 103. Even when the image pickup device 105 operates as a rolling shutter, if an exposure time of all pixels of the image pickup device 105 is equal to or longer than the operating time of the optical modulator 103, the controller 107 may synchronize the exposure time of the image pickup device 105 with the operating time of the optical modulator 103.

Figure 5:
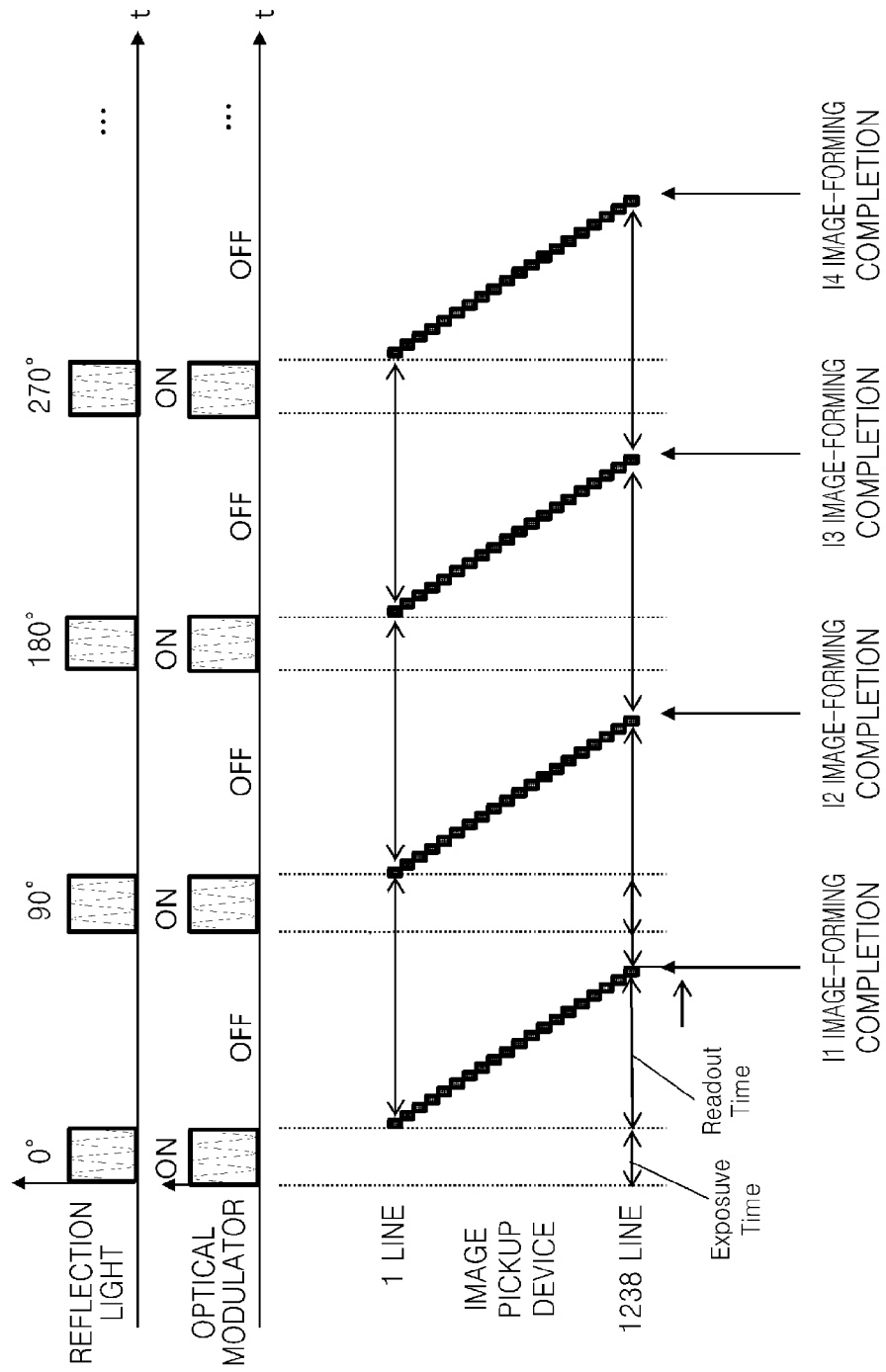
FIG. 5 is a time graph of when an image is captured by synchronizing a light source, an optical modulator, and an image pickup device with each other, according to an exemplary embodiment.

FIG. 5 is a time graph when an image is captured by synchronizing the light source 101, the optical modulator 103, and the image pickup device 105 with each other, according to an exemplary embodiment. For convenience of description, FIG. 5 illustrates a method of capturing an image with 4 projection light beams having different phase differences.

As shown in FIG. 5, when the image pickup device 105 operates as a rolling shutter, an exposure time and a sub-image forming time of the image pickup device 105 vary on a line by line basis. That is, the image pickup device 105 captures and forms a sub-image with a time delay on a line by line basis.

In FIG. 5, the light-projecting time of the light source 101, the operating time of the optical modulator 103, and the exposure time of the image pickup device 105 are synchronized with each other, and all pixels of the image pickup device 105 may be exposed during the exposure time of the image pickup device 105. In this case, N sub-images formed by the image pickup device 105 may sequentially one-to-one match N reflection light beams.

When a single operating time of the optical modulator 103 is shorter than the exposure time of all pixels in the image pickup device 105, not all pixels of the image pickup device 105 may be exposed during the single operating time of the optical modulator 103.

Figure 6:
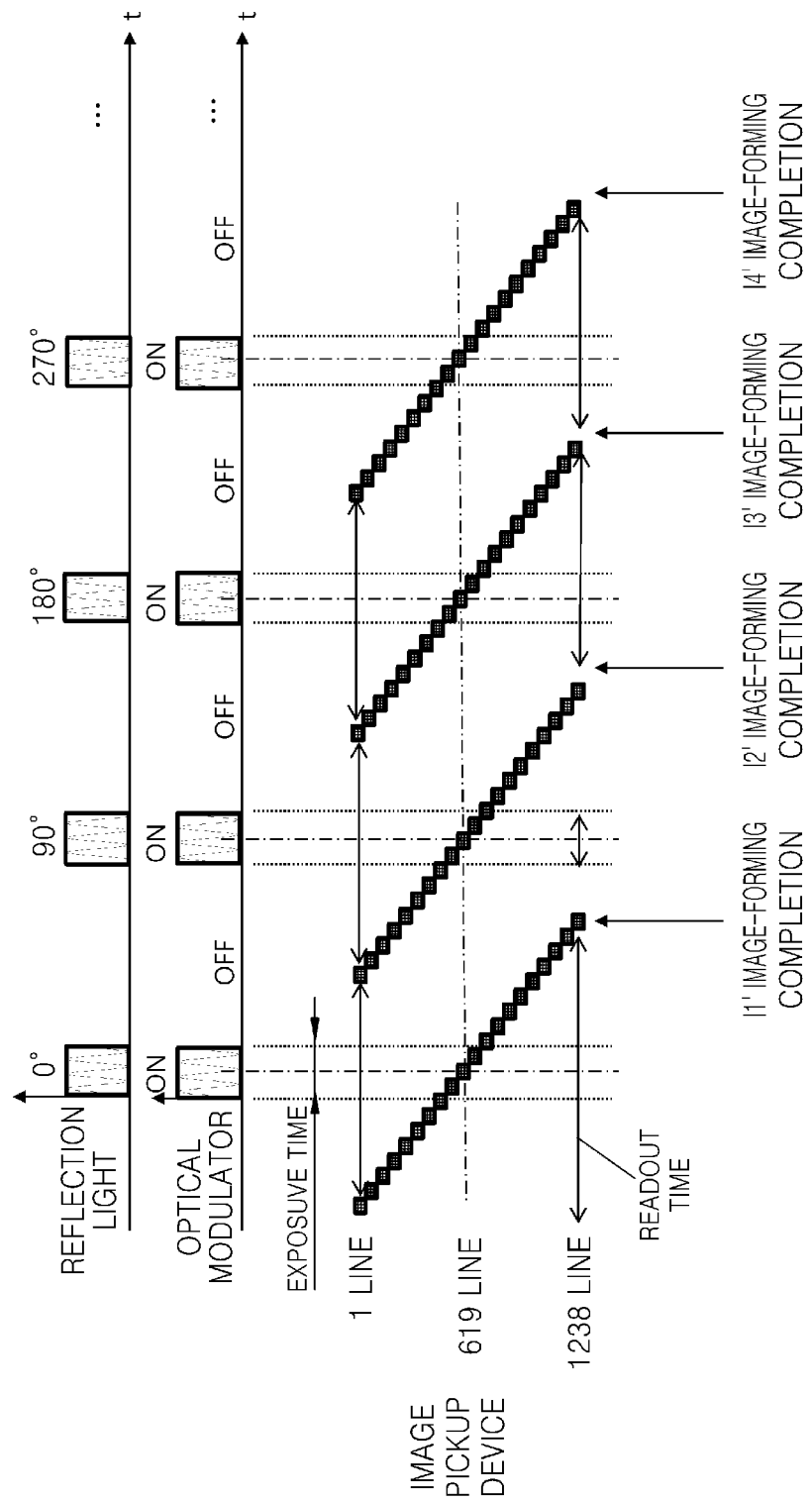
FIG. 6 is a time graph when an image is captured when not all pixels of an image pickup device are exposed during a single operating time of an optical modulator.

FIG. 6 is a time graph when an image is captured when not all pixels of the image pickup device 105 are exposed during the single operating time of the optical modulator 103. For convenience of description, FIG. 6 illustrates a method of capturing an image with 4 projection light beams having different phase differences.

As shown in FIG. 6, a partial pixel area of the image pickup device 105 may be exposed during the single operating time of the optical modulator 103. Accordingly, N reflection light beams may not sequentially one-to-one match line sub-images formed by the image pickup device 105. In this case, the signal processor 106 converts line sub-images $I_1'$, $I_2'$, $I_3'$, and $I_4'$ formed by the image pickup device 105 on a line by line basis into line sub-images $I_1$, $I_2$, $I_3$, and $I_4$ one-to-one matching N reflection light beams 0°, 90°, 180°, and 270°.

To do this, the signal processor 106 may apply a conversion matrix as expressed by Equation 6 to line sub-images formed on a line by line basis by the image pickup device 105. In Equation 6, a 4×4 conversion matrix for converting 4 line sub-images $I_1'$, $I_2'$, $I_3'$, and $I_4'$ corresponding to 4 reflection light beams is shown. Of course, an N×N conversion matrix may be applied to N line sub-images.

$$\begin{bmatrix} I_1 \\ I_2 \\ I_3 \\ I_4 \end{bmatrix}_{line\ k} = \begin{bmatrix} A_{11} & A_{12} & A_{13} & A_{14} \\ A_{21} & A_{22} & A_{23} & A_{24} \\ A_{31} & A_{32} & A_{33} & A_{34} \\ A_{41} & A_{42} & A_{43} & A_{44} \end{bmatrix}_{line\ k} \begin{bmatrix} I_1' \\ I_2' \\ I_3' \\ I_4' \end{bmatrix}_{line\ k} = A_{line\ k} \begin{bmatrix} I_1' \\ I_2' \\ I_3' \\ I_4' \end{bmatrix}_{line\ k} \quad (6)$$

Here, k denotes a line of the image pickup device 105, and $A_{ij}$ denotes a conversion value previously defined and stored based on an exposure time of the image pickup device 105 and an image-forming time of a sub-image.

For example, a conversion expression of a first line in FIG. 6 is expressed by Equation 7.

$$\begin{bmatrix} I_1 \\ I_2 \\ I_3 \\ I_4 \end{bmatrix}_{line\ 1} = \begin{bmatrix} 0 & 1 & 0 & 0 \\ 0 & 0 & 1 & 0 \\ 0 & 0 & 0 & 1 \\ 1 & 0 & 0 & 0 \end{bmatrix} \begin{bmatrix} I_1' \\ I_2' \\ I_3' \\ I_4' \end{bmatrix}_{line\ 1} = \begin{bmatrix} I_2' \\ I_3' \\ I_4' \\ I_1' \end{bmatrix}_{line\ 1} \quad (7)$$

A conversion expression of the last line, i.e., $1238^{th}$ line, is expressed by Equation 8.

$$\begin{bmatrix} I_1 \\ I_2 \\ I_3 \\ I_4 \end{bmatrix}_{line\ 1238} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} I_1' \\ I_2' \\ I_3' \\ I_4' \end{bmatrix}_{line\ 1238} = \begin{bmatrix} I_1' \\ I_2' \\ I_3' \\ I_4' \end{bmatrix}_{line\ 1238} \quad (8)$$

A sub-image $I^{(s)}$ converted by the conversion matrix may be applied to Equation 5.

After one-to-one matching N line sub-images with N phase differences, the signal processor 106 generates N sub-images by combining line-based line sub-images and then calculates depth information from the N sub-images.

Figure 7:
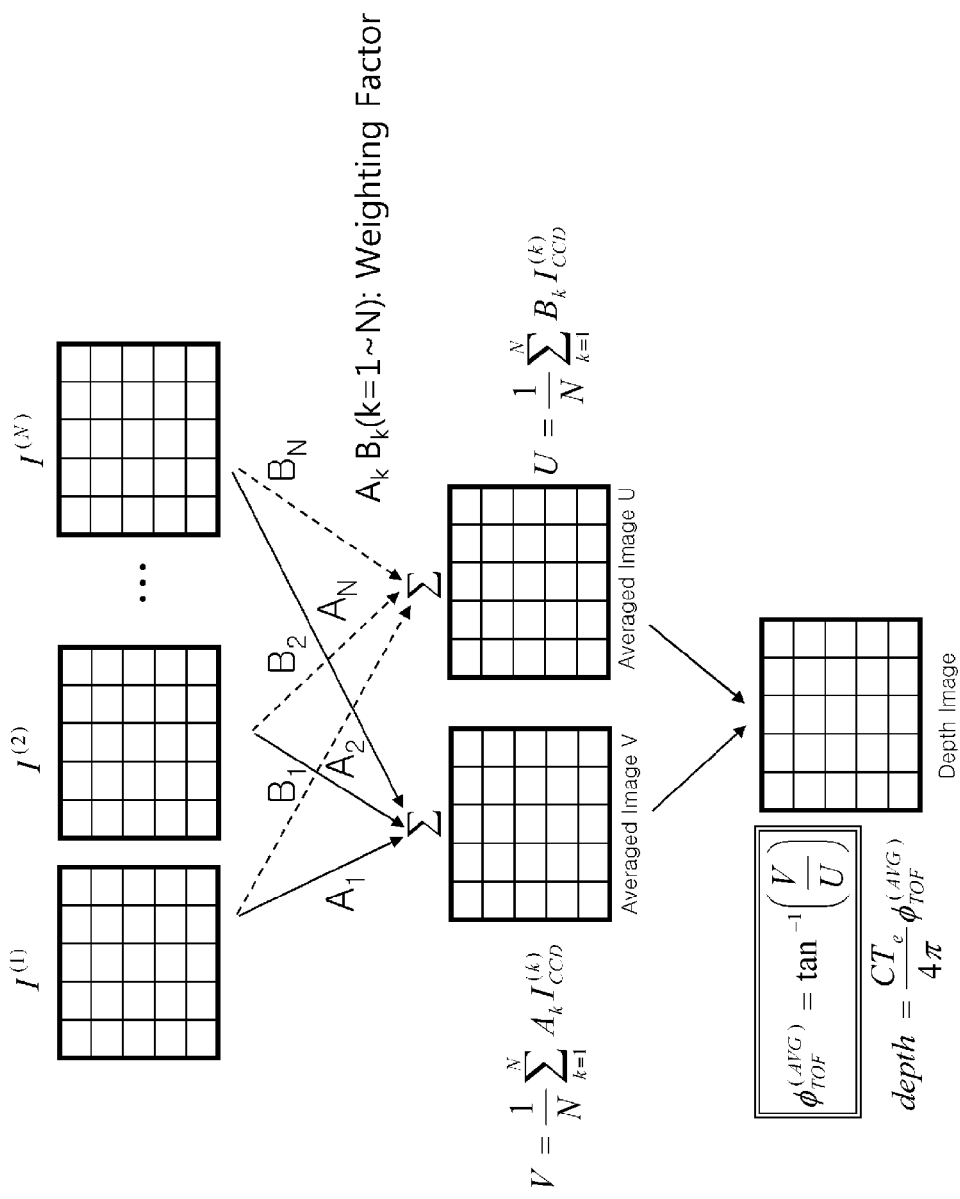
FIG. 7 is a schematic diagram for describing a process of calculating depth information from N different images, according to an exemplary embodiment.

FIG. 7 is a schematic diagram for describing a process of calculating depth information from N different images, according to an exemplary embodiment. Referring to FIG. 7, the signal processor 106 generates a first average image V by multiplying N sub-images by weighting factors $A_1$ to $A_N$, respectively, and averaging the weighted sub-images and generates a second average image U by multiplying the N sub-images by different weighting factors $B_1$ to $B_N$, respectively, and averaging the weighted sub-images.

The weighting factors $A_1$ to $A_N$ and $B_1$ to $B_N$ applied to this embodiment may be previously defined and stored based on the number N of sub-images. For example, weighting factors $A_k$ and $B_k$ may be expressed by Equation 9.

$A_k = \text{sum}[a^{(i)}\cos\theta^{(i)} - a^{(j)}\cos\theta^{(j)};(i,j)$ is $_{N-1}C_2^{(-k)}$ of $\{1:N\}]$ $B_k = \text{sum}[a^{(i)}\sin\theta^{(i)} - a^{(j)}\sin\theta^{(j)};(i,j)$ is $_{N-1}C_2^{(-k)}$ of $\{1:N\}]$ \quad (9)

In Equation 9, i and j denote any other numbers different from k from among natural numbers 1 to N (i≠k, j≠k), $a^{(i)}$ denotes the intensity of a projection light beam i, and a phase $\theta^{(i)}$ denotes a phase difference of the projection light beam i.

The weighting factors $A_k$ and $B_k$ may be used to calculate depth information in an operation of the 3D image acquisition apparatus 100 by being digitized using the predefined intensity $a^{(i)}$ and phase $\theta^{(i)}$ of the projection light beam i.

FIG. 8 is a table illustrating the weighting factors $A_k$ and $B_k$, according to an exemplary embodiment.

In the table of FIG. 8, it is assumed that the intensity of projection light is the same for any case and a phase is defined by equally dividing 360° by N. for example, when N=3, phases $\theta^{(1)}$, $\theta^{(2)}$, and $\theta^{(3)}$ are 0°, 120°, and 240°, respectively.

When previously calculated weighting factors, as shown in FIG. 8, are stored in a memory (not shown) of the 3D image acquisition apparatus 100, the signal processor 106 does not have to newly calculate weighting factors every time depth information is calculated. That is, the signal processor 106 may read proper weighting factors from the memory according to the number of captured sub-images and perform a computation that multiplies the captured sub-images by the read weighting factors. Thus, real-time calculation of depth information is possible. In addition, since a memory usage amount and a computation amount necessary to remove irregular noise may be significantly reduced, the size and manufacturing cost of the 3D image acquisition apparatus 100 may be reduced.

Although the table of FIG. 8 illustrates weighting factors for one set of intensity and phase of projection light, sets of weighting factors for various sets of intensities and phases of projection light may be previously calculated for actual use. Accordingly, when depth information is calculated, the signal processor 106 may read from the memory a set of weighting factors corresponding to a set of intensity and phase of used projection light and the number of captured sub-images. Here, the memory may be included in the controller 107 or the signal processor 106 or may be a separate storage device.

The use of weighting factors as described above may allow the signal processor 106 to calculate depth information from which irregular noise is removed even using a weighted-averaging method using only multiplication and addition instead of using a complex averaging algorithm.

The signal processor 106 may calculate depth information from an arctangent value (arctan=$\tan^{-1}$) of a ratio V/U of the first average image V to the second average image U. The depth information is calculated by Equation 10.

$$\text{depth} = \frac{CT_e}{4\pi} \phi_{TOF}^{(AVG)} \quad (10)$$

In Equation 10, C denotes the speed of light and $T_e$ denotes a period of a projection light waveform.

Although it has been described in FIG. 7 that the signal processor 106 calculates depth information of a frame of an image after receiving all of N sub-images and then calculates depth information of a subsequent frame of an image after receiving all of N new sub-images, the signal processor 106 is not limited thereto. That is, the signal processor 106 may update depth information for every sub-image.

For example, a method of calculating depth information from first to Nth sub-images is the same as the method described with reference to FIG. 3. Thereafter, when an (N+1)th sub-image is obtained, depth information may be newly calculated in the above-described weighted-averaging method using second to (N+1)th sub-images by removing the first sub-image. Likewise, when an (N+2)th sub-image is obtained, depth information may be newly calculated using third to (N+2)th sub-images by removing the second sub-image. In this way, new depth information may be calculated for every sub-image while N sub-images are maintained in the memory in a First-In First-Out (FIFO) method.

In addition, although a method of adding a new sub-image one-by-one and simultaneously removing an existing sub-image one-by-one has been described, a plurality of new sub-images may be added at the same time as the same number of existing sub-images are removed. For example, the total number of sub-images may be maintained as N by adding new sub-images less than N and removing the same number of old sub-images.

Alternatively, to calculate the first average image V and the second average image U, the signal processor 106 may calculate the first average image V and the second average image U by using recursive summation expressed by Equation 11.

$$V_{N+1} = V_N + A_N I^{(N)}$$
$$U_{N+1} = U_N + B_N I^{(N)} \quad (11)$$

In this case, when an Nth sub-image is captured, the signal processor 106 updates a first average image $V_N$ and a second average image $U_N$ and removes a first average image $V_{N-1}$ and a second average image $U_{N-1}$ generated when an (N−1)th sub-image is captured. As described above, if a first average image and a second average image are generated in the recursive summation method, all of N sub-images do not have to be stored, so a memory space may be saved. This memory space may be significant as a sub-image including depth information has high resolution more than a million pixels.

In this embodiment, a method of generating sub-images in the image pickup device 105 in which pixels are arranged in a 2D array form has been described. However, this sub-image generating method may be applied regardless of whether pixels are arranged in a 1D array form or a single pixel exists.

Figure 9:
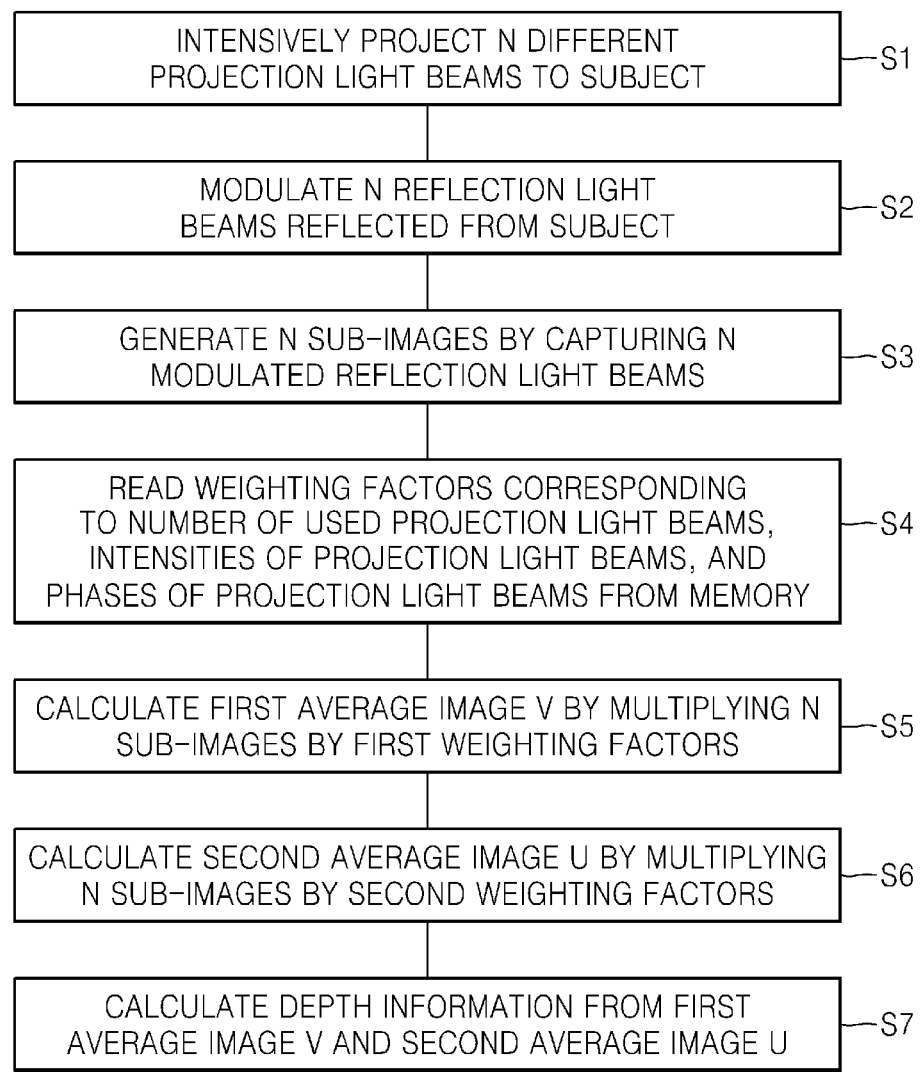
FIG. 9 is a flowchart illustrating a method of calculating depth information, according to an exemplary embodiment.

FIG. 9 is a flowchart illustrating the method of calculating depth information, which has been described above. Referring to FIG. 9, in operation (S1), the light source 101 sequentially projects N different projection light beams to the subject 200 under control of the controller 107. Here, N may be 3 or a larger natural number. The N different projection light beams may have waveforms of which periods are the same and intensities or phases are different from each other. The N different projection light beams are reflected from surfaces of the subject 200 and then are sequentially incident to the optical modulator 103 as N different reflection light beams. In operation (S2), an operating time of the optical modulator 103 is synchronized with a light-projecting time of the light source 101, and the optical modulator 103 modulates the N different reflection light beams reflected from the surfaces of the subject 200 with an optical modulation signal having a predetermined gain waveform. Here, the optical modulation signal may be a periodic wave having the same period as that of the projection light beams. As described above, when light is projected only for a predetermined time by synchronizing the light-projecting time of the light source 101 with the operating time of the optical modulator 103, and when the projected light is modulated, ambient light in the modulated light may be minimized.

In operation (S3), the image pickup device 105 generates N sub-images by sequentially capturing the N modulated reflection light beams. An exposure time of the image pickup device 150 may also be synchronized with the operating time of the optical modulator 103. The N generated sub-images are delivered to the signal processor 106.

The N sub-images generated by the image pickup device 150 may sequentially one-to-one match the N reflection light beams. However, when the N sub-images do not sequentially one-to-one match the N reflection light beams, the signal processor 106 may convert the N sub-images on a line by line basis to one-to-one match the N line-based sub-images with the N reflection light beams.

In operation (S4), the signal processor 106 reads predetermined previously calculated weighting factors $A_k$ and $B_k$ from the memory. As described above, the weighting factors $A_k$ and $B_k$ may be defined based on the number N of used projection light beams, intensities of the projection light beams, and phases of the projection light beams. Various weighting factors $A_k$ and $B_k$ are previously calculated and stored in the memory according to various sets of the number N of projection light beams, intensities of the projection light beams, and phases of the projection light beams. The signal processor 106 may read weighting factors corresponding to the number N of actually used projection light beams, intensities of the projection light beams, and phases of the projection light beams from among the various weighting factors $A_k$ and $B_k$ stored in the memory.

In operation (S5), the signal processor 106 obtains a first average image V by multiplying the N sub-images one-to-one matching the N reflection light beams by first weighting factors $A_k$ and averaging the multiplication results. Likewise, in operation (S6), the signal processor 106 obtains a second average image U by multiplying the N sub-images by second weighting factors $B_k$ and averaging the multiplication results. In operation (S7), the signal processor 106 calculates depth information, which is a distance from the 3D image acquisition apparatus 100 to the subject 200, from an arctangent value of a ratio (V/U) of the first average image V to the second average image U. According to the current embodiment, even if the number N of sub-images increases, since only multiplication and addition operations to obtain the first average image V and the second average image U increase proportionally, an increase in a computation amount is very small. Thus, very accurate depth information from which irregular noise is removed may be obtained with only a relatively small computation amount.

Although the embodiment using N different projection light beams has been described in FIG. 9, as described above, N different optical modulation signals may be used instead of using N different projection light beams. For example, the N different optical modulation signals may be periodic waves having the same period and waveform and different intensities or phases. Even in this case, N different sub-images may be obtained by the image pickup device 105, and the succeeding process that calculates depth information may be equally applied. However, first and second weighting factors may be defined according to the intensities and phases of the N different optical modulation signals.

The signal processor 106 for calculating depth information from which irregular noise is removed by performing the above-described operations may be implemented by an exclusive IC or software installed in a general computer device, such as a Personal Computer (PC), as described above. When the signal processor 106 is implemented by software, the signal processor 106 may be stored in a separate portable storage medium in a computer-executable format.

Exemplary embodiments of a 3D image acquisition apparatus and a method of calculating depth information in the 3D image acquisition apparatus have been described and shown in the accompanying drawings. However, it should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. A 3-dimensional (3D) image acquisition apparatus comprising:
    an optical modulator which modulates light reflected from a subject by sequentially projected N light beams;
    an image sensor which generates N sub-images by capturing the light modulated by the optical modulator; and
    a signal processor which calculates depth information corresponding to a distance to the subject by using the N sub-images,
    wherein N is a natural number that is greater than or equal to 3, and
    wherein the image sensor is exposed during a projecting time of each light beam of the N light beams to capture the modulated light and forms the N sub-images during at least a portion of a remaining time of the projecting time of each light beam of the N light beams.

2. The 3D image acquisition apparatus of claim 1, wherein the N light beams are discontinuously projected.

3. The 3D image acquisition apparatus of claim 1, wherein the N projected light beams are different from each other and are emitted by one or more light sources.

4. The 3D image acquisition apparatus of claim 3, wherein the one or more light sources sequentially project the N light beams with a predetermined time interval.

5. The 3D image acquisition apparatus of claim 1, wherein an operating time of the optical modulator is synchronized with the projecting time of each light beam of the N light beams.

6. The 3D image acquisition apparatus of claim 5, wherein the operating time of the optical modulator is shorter than the projecting time.

7. The 3D image acquisition apparatus of claim 5, wherein an exposure time of the image sensor is synchronized with the operating time of the optical modulator.

8. The 3D image acquisition apparatus of claim 1, wherein all pixels of the image sensor are exposed to the modulated light during the projecting time of each light beam of the N light beams.

9. The 3D image acquisition apparatus of claim 1, wherein the N light beams are periodic waves having a same period and at least one light beam from among the N light beams comprises a different intensity and a different phase from the other N light beams.

10. The 3D image acquisition apparatus of claim 9, wherein the optical modulator modulates the reflected light with the same modulation signal.

11. The 3D image acquisition apparatus of claim 1, wherein the N light beams have the same periodic waves.

12. The 3D image acquisition apparatus of claim 1, wherein the optical modulator modulates the reflected light with different modulation signals.

13. The 3D image acquisition apparatus of claim 1, wherein a phase difference between any two light beams projected at adjacent times from among the N light beams is a value obtained by dividing 360° by N.

14. The 3D image acquisition apparatus of claim 1, wherein the reflected light includes N reflection light beams obtained by reflecting the N light beams from the subject.

15. The 3D image acquisition apparatus of claim 1, wherein the N sub-images generated by the image sensor to sequentially one-to-one match the N reflection light beams.

16. The 3D image acquisition apparatus of claim 1, wherein, if the N sub-images do not one-to-one match the N reflection light beams, the signal processor converts the N sub-images on a line by line basis and sequentially one-to-one matches the N line-based sub-images with the N reflection light beams.

17. The 3D image acquisition apparatus of claim 1, wherein the signal processor generates a first average image by averaging the N sub-images multiplied by first weighting factors, generates a second average image by averaging the N sub-images multiplied by second weighting factors, and calculates the depth information from the first average image and the second average image.

18. The 3D image acquisition apparatus of claim 17, wherein the depth information is calculated from an arctangent value of a ratio of the first average image to the second average image.

19. A method of calculating depth information, the method comprising:
    modulating light reflected from a subject by sequentially projecting N light beams;
    generating N sub-images by capturing the modulated light; and
    calculating depth information regarding a distance to the subject by using the N sub-images,
    wherein N is a natural number that is greater than or equal to 3, and
    wherein an image sensor is exposed during a projecting time of each light beam of the N light beams to capture the modulated light and form the N sub-images during at least a portion of a remaining time of the projecting time of each light beam of the N light beams.

20. The method of claim 19, wherein the N light beams are discontinuously projected.

21. The method of claim 19, wherein the N projected light beams are different from each other and are emitted by one or more light sources.

22. The method of claim 21, wherein the N light beams are sequentially projected with a predetermined time interval.

23. The method of claim 19, wherein an operating time of an optical modulator for modulating the light is synchronized with the projecting time of each light beam of the N light beams.

24. The method of claim 23, wherein the operating time of the optical modulator is shorter than the projecting time.

25. The method of claim 23, wherein an exposure time of the image sensor which captures the light is synchronized with the operating time of the optical modulator.

26. The method of claim 25, wherein all pixels of the image sensor are exposed to the modulated light during the projecting time of each light beam of the N light beams.

27. The method of claim 19, wherein the N light beams are periodic waves having a same period and at least one light beam from among the N light beams comprises a different intensity and a different phase from the other N light beams, and the reflected light is modulated with the same modulation signal.

28. The method of claim 19, wherein the N light beams have the same periodic waves, and the reflected light is modulated with different modulation signals.

29. The method of claim 19, wherein a phase difference between any two light beams projected at adjacent times from among the N light beams is a value obtained by dividing 360° by N.

30. The method of claim 19, wherein the generated N sub-images sequentially one-to-one match the N reflection light beams.

31. The method of claim 19, further comprising, if the N sub-images do not one-to-one match the N reflection light beams, converting the N sub-images on a line by line basis and sequentially one-to-one matching the N line-based sub-images with the N reflection light beams.

32. The method of claim 19, wherein a first average image is generated by averaging the N sub-images multiplied by first weighting factors, a second average image is generated by averaging the N sub-images multiplied by second weighting factors, and the depth information is calculated from the first average image and the second average image.

33. The method of claim 32, wherein the depth information is calculated from an arctangent value of a ratio of the first average image to the second average image.

* * * * *